3,700,614
HIGH IMPACT POLYPROPYLENE BLENDS
William F. Schenkerberg, Bogota, N.J., assignor to Dart Industries Inc., Los Angeles, Calif.
No Drawing. Filed May 7, 1971, Ser. No. 141,358
Int. Cl. C08f 19/14, 21/04
U.S. Cl. 260—23 H     10 Claims

ABSTRACT OF THE DISCLOSURE

The addition of finely divided particles of stearic acid coated calcium carbonate to blends of substantially crystalline polymers and copolymers of propylene and an elastomeric material results in a product having improved impact strength and improved flexural stiffness over the blends without the finely divided particles.

BACKGROUND OF THE INVENTION

This invention relates to blends of at least three components, namely substantially crystalline polymers and copolymers of propylene, an elastomeric material and a modifier. Specifically, it relates to an improvement in blends of polypropylene and an elastomeric material whose characteristics high impact strength is retained as their flexural stiffness is increased by the addition of a modifier which is stearic acid coated calcium carbonate.

PRIOR ART

In the prior art, it is known to produce high impact plastics for extruded and molded articles by blending polypropylene and an elastomer such as amorphous ethylene/propylene copolymer or polyisobutylene and often with third and fourth copolymeric ingredients. Generally, the polypropylene component is present at 50 to 90% by weight of the total blend.

These blends are, however, found to be difficult to process, since they have a tendency during the blending operation to stick to the internal surfaces of the blender at the processing temperature. It is necessary to operate a blender at high temperatures (i.e. 120–200° C.), since the melt flow of the individual ingredients, especially polypropylene, which predominates, is high (typically 2–12 g./10 min.).

Moreover, in polypropylene-ethylene/propylene rubber (EPR) blends, it is found that reduction in total weight of EPR results in a marked decrease in impact strength and an increase in flexural stiffness. Thus, in those applications requiring a stiff product, one has had to sacrifice high impact strength.

Also, in the prior art blends which included a third component such as polyethylene, as the quantity of polypropylene is held constant and the quantity of EPR is decreased by reason of increasing the weight of polyethylene added, the impact strength decreases while the stiffness remains somewhat constant.

It is, therefore, seen that the art has not had available a rubber-modified polypropylene blend which can retain its impact strength as stiffness is increased by reduction of the total quantity of EPR present either by replacement with more polypropylene or with a third component and which is easily processable.

SUMMARY OF THE INVENTION

It is a primary object of this invention to increase the stiffness of rubber-modified polypropylene blends while retaining the high impact strength.

It is a further object of this invention to provide a rubber-modified blend which is more easily processed at blending conditions and which will not stick to blenders at the temperature required for proper blending.

These and other objects will be fulfilled, in accordance with this invention, by addition of 1 to 30% by weight of stearic acid coated calcium carbonate particles to a blend comprising at least 50% by weight of a polypropylene component, and the remainder predominately an elastomeric component. The elastomeric component is polyisobutylene, EPR or ethylene/propylene/diene (EPDM). Optionally polyethylene can be included in the blend in amounts up to about 40 percent.

A preferred blend comprises from about 40 to about 97% by weight of the polypropylene component, from about 2 to about 30% by weight of the elastomeric component and from about 1 to 30% by weight of finely divided stearic acid coated calcium carbonate particles. The majority of the particles have a size of less than 4 microns. The weight ratio of the elastomeric component to the particles is in the range of about 0.1 to 4, and more preferably is in the range of about 0.5 to 2. A still more preferred blend comprises from about 50 to about 90% by weight of the polypropylene component, from about 5 to about 30% by weight of the elastomeric component, and from about 5 to about 20% by weight of the stearic acid coated calcium carbonate.

The polypropylene component of this invention is a normally solid, substantially crystalline polymer having a melt flow below about 12 g./10 min. at 44 p.s.i. and 230° C. and preferably from about 0.01 to about 5. The polypropylene component has a minimum heptane insoluble conent of 80% to assure that it has sufficient crystallinity. It has been found that the higher the crystallinity the greater the improvement in the aforesaid physical properties. This component can be either propylene homopolymer or a copolymer comprising propylene and no greater than 25% by weight ethylene or another alpha olefin. Such other alpha olefins include butene-1, pentene-1, hexene-1, heptenes, octenes, nonenes, decenes and the like and mixtures thereof. A particularly preferred copolymer comprises propylene and up to 25% by weight of ethylene.

The amorphous ethylene/propylene copolymers which are preferably incorporated into the blends of this invention contain from about 5 to about 75% by weight of combined propylene and from about 25 to about 95% by weight of combined ethylene. The amorphous ethylene/propylene preferably contains from about 20 to about 65% by weight combined propylene and from about 35 to about 80% by weight combined ethylene. The amorphous copolymers employed herein are normally solid copolymers having a crystallinity of less than about 20% and having melt indices at 190° C. and 44 p.s.i. of less than about 1000 dg./min. and preferably less than about 100 dg./min. Preferably such copolymers are completely non-crystalline.

The ethylene/propylene/diene terpolymers employed in the blends of this invention include, in addition to the ethylene and propylene in the amounts noted in the preceding paragraph, a minor percentage of a nonconjugated diene such as dicyclopentadiene, methylene norbornene, methylcyclopentadiene, 1,5-cyclooctadiene, 1,4-hexadiene, 1,5-cyclooctadiene or other copolymerizable diene.

The polyisobutylenes that may be incorporated into the blends of this invention have melt indices at 190° C. and 44 p.s.i. of less than about 1000 dg./min. and preferably less than about 100 dg./min.

As the essential third component of the blend, this invention utilizes stearic acid coated calcium carbonate particles. One source of this ingredient is the "Winnofil® S" product of I.C.I./Organics/Inc., Stamford, Conn. This product is stated as a precipitated stearic acid coated calcium carbonate comprising ultrafine particles of about 75 millimicrons.

Other optional components used in the art of rubber-modified polypropylene blends can be added to the blends to vary properties of the ultimate product. One preferred and typically added component is polyethylene which is a normally solid homopolymer. Either the high density (0.94 to 0.97 at 25° C.) or low density (0.91 to 0.93 at 25° C.) type polyethylene or mixtures thereof can be employed herein. The melt index of such polyethylene components will be below about 100 dg./min. at 44 p.s.i. and 190° C. Moreover, halogenated PE can be employed.

The blending technique illustrated in the examples uses a Banbury mixer, but such other conventional techniques as kneading, roll milling, melting and then mixing, dissolving in solvents (e.g. toluene or any xylene) and evaporating the solvent or precipitating the mixture (e.g. by addition of a ketone or alcohol) can be used. Under these conditions, the mixtures being blended according to this invention do not stick to the mixer whereas in the comparisons (excluding the coated calcium carbonate) sticking is experienced. Such molding techniques as injection molding, extrusion, blow molding and thermoforming can be used to shape the blended mixture into such articles as battery cases, automotive parts, appliance parts, high tenacity fibers, piping, luggage and seating.

A masterbatch technique is conveniently employed in preparing the blends. If, for example, it is desired to prepare a polypropylene blend containing 10% ethylene/propylene copolymer and 10% stearic acid coated calcium carbonate, a masterbatch of equal amounts of polypropylene and ethylene/propylene copolymer is first prepared. A subsequent letdown in a Banbury mixer of the masterbatch at 7 parts by weight of polypropylene, 1 part by weight of stearic acid coated calcium carbonate and 2 parts by weight of masterbatch results in the desired blend.

The blends of this invention can also contain stabilizers, antioxidants, colorants, flame retardants, processing aids, antistatic agents, fillers and other additives if desired. All of these additives can be easily incorporated, when necessary, in the mixer during blending.

In order to more fully understand the invention and appreciate its advantages, a series of examples are presented below to illustrate the retention of high impact strength and flexural stiffness, as the compositions are varied.

EXAMPLE 1

A 1000 gm. charge composed as follows:

| | Grams |
|---|---|
| Powdered polypropylene (PP) having a melt flow of 2.6 to 2.8 and heptane insolubles of at least 95 wt. percent | 797.0 |
| Ethylene/propylene rubber (EPR-A) comprising between 40 and 46 wt. percent ethylene, no unsaturation and having a Mooney viscosity value of between 35 and 45 (Enjay's Vistalon® EPR-404) | 100.0 |
| Stearic acid coated calcium carbonate (SA/CC) (Winnofil® S) | 100.0 |
| Stabilizer system 2,6 - di - t - butyl-4-methyl-phenol (Shell's Ionol) | 1.0 |
| 3/1 condensate of 3-methyl-6-t-butyl-phenyl with crotonaldehyde (ICI's Topanal CA) | 1.0 |
| Dilauryl-thio-di-propionate | 1.0 | was charged as a single unit to a Banbury mixer, heated to 360° F. and blended for three minutes after initial shear.

The melt was removed from the mixer without experiencing sticking and sheeted on an unheated roll mill and allowed to cool. The cooled sheet was ground and injection molded at 140° F. and 700 p.s.i. into a ⅛″ x ½″ x 8″ rectangular test bar. The bar was conditioned as usual and then subjected to testing to determine the product characteristics as follows:

(1) Melt flow—Determined by ASTM D 1238 at 44 p.s.i. and 230° C. for polypropylene and at 44 p.s.i. and 190° C. for polyethylene, polyisobutylene, and ethylene/propylene copolymer (results are grams/ten [10] minutes).

(2) Notched Izod Impact Test by ASTM D-256 using ⅛″ specimens at 23° C. (results are foot-pounds per inch of notch).

(3) Flexural stiffness by ASTM D-747 (results are in pounds per square inch).

(4) Tensile properties—Determined by ASTM D-638 (yield and tensile strengths are in pounds per square inch).

The summary of the composition and the results of Example 1 are included in Table I below.

TABLE I.—HIGH IMPACT POLYPROPYLENE BLENDS

| | Percent | | | | | | Melt flow | Notched Izod impact | Flexural Stiffness |
|---|---|---|---|---|---|---|---|---|---|
| | PP | EPR-A | EPR-B | HDPE | LDPE | SA/CC | | | |
| Example: | | | | | | | | | |
| 1 | 80 | 10 | | | | 10 | 1.9 | 4.3 | 129,000 |
| 2 | 70 | 10 | | | | 20 | 1.8 | 9.4 | 139,000 |
| 3 | 70 | 20 | | | | 10 | 1.6 | 13.0 | 100,000 |
| 4 | 70 | 5 | | | 15 | 10 | 1.5 | 11.5 | 111,000 |
| 5 | 70 | | 20 | | | 10 | 1.2 | 10.5 | 114,000 |
| 6 | 70 | | 10 | | | 20 | 1.7 | 9.4 | 158,000 |
| 7 | 81 | 2.4 | | 11.9 | | 4.8 | 1.7 | 5.7 | 149,000 |
| 8 | 76.2 | 3.8 | | 15.2 | | 4.8 | 1.6 | 8.3 | 149,000 |
| Control: | | | | | | | | | |
| A | 100 | | | | | | 2.7 | 0.8 | 157,000 |
| B | 90 | 10 | | | | | 2.1 | 2.3 | 118,000 |
| C | 80 | 20 | | | | | 1.8 | 5.4 | 89,000 |
| D | 80 | 5 | | | 15 | | 1.9 | 3.5 | 105,000 |
| E | 80 | | 20 | | | | 1.5 | 7.6 | 104,000 |
| F | 90 | | 10 | | | | 1.7 | 2.0 | 128,000 |
| G | 85 | 2.5 | | 12.5 | | | 2.2 | 5.7 | 135,000 |
| H | 80 | 4 | | 16 | | | 1.9 | 9.8 | 133,000 |
| I | 96.2 | | | | | 3.8 | 2.1 | 1.2 | 156,000 |

EXAMPLES 2–8

The procedure for preparing the composition of Example 1 was repeated for Examples 2–8 using the same stabilizer system. The variations in polypropylene, ethylene/propylene rubber and the stearic acid coated calcium carbonate are presented in Table I above.

In Example 4, a low density polyethylene (LDPE) (Dart Industries' XO–440) having a density of 0.92 and a melt index of 0.2 dg./min. was incorporated into the blend.

In Examples 5 and 6 EPR-B (Enjay's Vistalon® EPR–484) was substituted for EPR-A, the difference being that EPR-B has a higher molecular weight.

In Examples 7 and 8 a high density polyethylene (HDPE) (Allied Chemical's Grex® PP 60–002) having a density of 0.96 and a melt index of 0.2 dg./min. was incorporated into the blend.

CONTROLS A–I

The procedure for preparing the composition of Example I was used for Controls A–I except that a 4 minute Banbury cycle was used in Controls A and C instead of a 3 minute cycle. In addition to the components listed in Table I, the same stabilizer system was used in these Controls that was used in the Example I composition.

The compositions of Controls A through H were found to stick to the sides and the agitator blades of the blender on removing the melt therefrom.

Table I above indicates that the addition of 10 parts of EPR-A to polypropylene increases the notched Izod impact strength by 1.5 ft.-lbs./in. and decreases the flexural stiffness by 39,000 p.s.i. on comparing Controls A with B. On the other hand, the addition of 10 parts of EPR-A and 10 parts of stearic acid coated calcium carbonate, increases the notched Izod impact strength by 3.5 ft.-lbs./in. while only decreasing the flexural stiffness by 28,000 p.s.i. on comparing Example 1 with Control I. An even greater improvement is shown on comparing Exampel 2 with Control I in which there is an 8.6 increase in the Izod with only an 18,000 p.s.i. decrease in stiffness. A similar comparison can be made between the following Example—Control pairs in Table I:

Example 3—Control C  Example 6—Control F
Example 4—Control D  Example 7—Control G
Example 5—Control E  Example 8—Control H
Examples 1–8—Control I charge was mixed in the Banbury for 3 minutes or until the temperature of the charge reached 350° F.

Control J is a blend of the ethylene/propylene random copolymer used as the polypropylene component of Examples 9–14 and the same stabilizer system used in Example 1.

Table II below sets forth the summary of the compositions and the results of these examples and Control J.

TABLE II.—HIGH IMPACT COPOLYMER BLENDS

| | Percent | | | Melt flow | Notched Izod impact | Flexural stiffness |
|---|---|---|---|---|---|---|
| | PP copolymer | ERP-A | SA/CC | | | |
| Example: | | | | | | |
| 9 | 80 | 2.5 | 17.5 | 4.1 | 1.6 | 150,000 |
| 10 | 80 | 5 | 15 | 3.8 | 9.1 | 150,000 |
| 11 | 80 | 10 | 10 | 3.3 | 14.6 | 130,000 |
| 12 | 70 | 5 | 25 | 3.5 | 1.9 | 133,000 |
| 13 | 80 | 10 | 10 | (1) | 9.3 | 140,000 |
| 14 | 70 | 10 | 20 | 4.4 | 14.8 | 160,000 |
| Control J | 100 | | | 4.6 | 1.0 | 170,000 |

[1] Not available.

EXAMPLES 15–22

The same procedure for preparing the Example 1 composition was used to prepare the compositions of Examples 15–22 except that the charge was mixed in the Banbury for 3 minutes or until the temperature of the charge reached 350° F.

Control K is a blend of the same stabilizer system used in Example 1 and the propylene homopolymer used as the polypropylene component in Examples 15–22. Control K has essentially the same composition as that of Control A except that it has an Izod impact strength of 0.6 instead of 0.8.

The summary of the compositions and the results of Examples 15–22 and Control K are presented in Table III below.

TABLE III.—PHYSICAL PROPERTIES OF BLENDS

| | Percent | | | Notched Izod impact | Flexural stiffness | Yield strength | Tensile strength | Elongation, percent |
|---|---|---|---|---|---|---|---|---|
| | PP | EPR-A | SA/CC | | | | | |
| Example: | | | | | | | | |
| 15 [1] | 80 | 10 | 10 | 2.1 | 160,000 | 3,800 | 2,400 | 200 |
| 16 [1] | 70 | 20 | 10 | 12.3 | 120,000 | 3,100 | 2,900 | 520 |
| 17 [1] | 70 | 15 | 15 | 4.1 | 140,000 | 3,300 | 2,500 | 210 |
| 18 [1] | 70 | 10 | 20 | 2.3 | 170,000 | 3,400 | 2,600 | 290 |
| 19 | 60 | 20 | 20 | 11.2 | 130,000 | 2,900 | 2,700 | 480 |
| 20 | 50 | 20 | 30 | 12.5 | 80,000 | 2,200 | 2,500 | 520 |
| 21 | 50 | 30 | 20 | 13.8 | 120,000 | 2,700 | 2,200 | 50 |
| 22 | 40 | 30 | 30 | 10.8 | 80,000 | 1,800 | 1,900 | 330 |
| Control K | 100 | | | 0.6 | (2) | (2) | (2) | (2) |

[1] These blends were prepared from 50/50 polypropylene/EPR-A masterbatch technique described above.
[2] Not available.

EXAMPLES 9–14

The same 1000 gm. charge was prepared for each of the Examples 9–14 that was prepared in Example 1 except that an ethylene/propylene random copolymer containing about 5.5% by weight ethylene, having a melt flow of about 4.6 and a heptane insoluble content of at least 93 wt. percent was employed in place of the propylene homopolymer. The same procedure was followed in these examples that was followed in Example 1 except that the

EXAMPLES 23 AND 24

These examples illustrate that a similar improvement in impact strength and retention of flexural stiffness is experienced by blending other elastomeric components in place of ethylene/propylene rubber such as ethylene/propylene/diene terpolymer rubber (Example 23) and polyisobutylene (Example 24) with the polypropylene component and stearic acid coated calcium carbonate. The procedures for preparing the blends of these examples and Controls L-X were the same as those followed under Examples 9-14.

Table IV below summarizes the compositions and results of Examples 23 and 24 and Controls L-Z.

TABLE IV.—HIGH IMPACT POLYPROPYLENE BLENDS WITH VARIOUS ELASTOMERIC COMPONENTS

| | Percent | | | Notched Izod impact | Flexural stiffness |
|---|---|---|---|---|---|
| | PP copolymer | Elastomeric component | SA/CC | | |
| Example: | | | | | |
| 15[1] | [2] 80 | [3] 10 | 10 | 2.1 | 160,000 |
| 13[1] | [4] 80 | [3] 10 | 10 | 9.3 | 140,000 |
| 23 | [4] 80 | [5] 10 | 10 | 11.4 | 140,000 |
| 24 | [4] 80 | [6] 10 | 10 | 3.6 | 120,000 |
| Control: | | | | | |
| L | [2] 95 | [3] 5 | | 1.2 | 170,000 |
| M | [2] 90 | [3] 10 | | 1.3 | 160,000 |
| N | [2] 80 | [3] 20 | | 4.1 | 120,000 |
| O | [2] 70 | [3] 30 | | 4.3 | 110,000 |
| P | [2] 60 | [3] 40 | | 13.6 | 70,000 |
| Q | [2] 95 | [5] 5 | | 0.9 | 190,000 |
| R | [2] 90 | [5] 10 | | 1.3 | 160,000 |
| S | [2] 80 | [5] 20 | | 4.6 | 130,000 |
| T | [2] 70 | [5] 30 | | 3.6 | 100,000 |
| U | [2] 60 | [5] 40 | | 12.2 | 70,000 |
| V | [2] 95 | [6] 5 | | 0.7 | 170,000 |
| W | [2] 90 | [6] 10 | | 0.8 | 170,000 |
| X | [2] 80 | [6] 20 | | 1.4 | 130,000 |
| Y | [2] 70 | [6] 30 | | 1.4 | 110,000 |
| Z | [2] 60 | [6] 40 | | 7.9 | 80,000 |

[1] Included in Table IV for comparative purposes.
[2] Propylene homopolymer having an Izod impact strength of 0.6.
[3] EPR-A (Enjay's Vistalon® 404).
[4] Ethylene/propylene random copolymer containing about 5.5% ethylene and having an Izod impact strength of 1.0.
[5] Ethylene/propylene/diene terpolymer having a Mooney Viscosity ML (1+8 min.) at 260° F. of 50 and medium unsaturation (Enjay's Vistalon® 3708).
[6] Medium molecular weight polyisobutylene having no unsaturation, a specific gravity of 0.92 and a Staudinger M.W. of between 99,000–117,000 as determined from intrinsic viscosity in diisobutylene at 20° C. (Enjay's Vistanex® MML-120).

It is evident from the foregoing examples that in the three and four component blends of this invention as the amount of elastomer is increased with the amount of polyproplene being held constant the impact strength is greatly increased and the flexible stiffness is retained. Generally, the impact strength of the blends increases in proportion to the amount of stearic acid coated calcium carbonate that is added to the blend. In contrast, the Controls indicate that as the amount of elastomer is increased the impact strength exhibits only small increases until over 30 weight percent of the elastomer is added and the flexural stiffness is greatly decreased. It is also evident from these examples that the rubber-modified blend of this invention retains its impact strength as the flexural stiffness is increased and as the total quantity of rubber is replaced by the addition of polypropylene or with another component. In all of the compositions of this invention, the presence of stearic acid coated calcium carbonate eliminates sticking at 350°±150° F. in the Banbury Mixer and the blends are all noticeably whiter in color than the controls.

What is claimed is:

1. A blend comprising a polypropylene component having a melt flow below about 12 g./10 minutes at 44 p.s.i. and 230° C. and a minimum heptane insoluble content of about 80% and an elastomeric component which is polyisobutylene, amorphous ethylene/propylene copolymer or ethylene/propylene/diene terpolymer, wherein said polypropylene component constitutes at least 50% of the combined weight of said polypropylene and elastomeric components, and from about 1 to 30% based on the weight of said blend of stearic acid coated calcium carbonate particles.

2. The blend of claim 1 wherein polyethylene is present in an amount of up to 40% based on the weight of said blend.

3. The blend of claim 1 wherein the weight ratio of said elastomeric component to said particles is in the range of about 0.1 to 4.

4. The blend of claim 1 wherein the majority of said particles are less than 4 microns.

5. The blend of claim 1 wherein said polypropylene component is a copolymer comprising propylene and no greater than 25% by weight of ethylene or another alpha olefin.

6. A blend which comprises from about 40 to about 97% by weight of a normally solid substantially crystalline polypropylene component which is propylene homopolymer or a copolymer comprising propylene and no greater than 25% by weight ethylene or another alpha olefin and which has a melt flow below about 12 g./10 min. at 44 p.s.i. and 230° C. and a minimum heptane insoluble content of about 80%, from about 2 to about 30% by weight of an elastomeric component which is polyisobutylene, amorphous ethylene/propylene copolymer or ethylene/propylene/diene terpolymer and from about 1 to 30% by weight of finely divided stearic acid coated calcium carbonate particles, the majority of which have a size of less than 4 microns, wherein the weight ratio of said elastomeric component to said particles is in the range of about 0.1 to 4.

7. The blend of claim 6 wherein polyethylene is present in an amount of up to 40% based on the weight of said blend.

8. A blend having high impact strength and high flexural stiffness which comprises from about 50 to about 90% by weight of a normally solid, substantially crystalline polypropylene component which is propylene homopolymer or a copolymer comprising propylene and no greater than 25% by weight of ethylene and which has a melt flow below abolt 12 g./10 min. at 44 p.s.i. and 230° C. and a minimum heptane insoluble content of about 80%, about 5 to about 30% by weight of an elastomeric component which is polyisobutylene, amorphous ethylene/propylene copolymer or ethylene/propylene/diene terpolymer, and from about 5 to about 20% by weight of finely divided stearic acid coated calcium carbonate particles, the majority of which have a size of less than 4 microns, wherein the weight ratio of said elastomeric component to said particles is in the range of about 0.5 to 2.

9. The blend of claim 8 wherein said elastomeric component is amorphous ethylene/propylene copolymer containing from about 5 to abolt 75% by weight of combined propylene and from about 25 to about 95% by weight of combined ethylene and having a melt index of less than about 1000 dg./min.

10. The blend of claim 9 wherein said polypropylene component has a heptane insoluble content of at least 93%.

References Cited

UNITED STATES PATENTS

| | | | |
|---|---|---|---|
| 3,362,924 | 1/1968 | Eastman | 260—23 |
| 3,517,086 | 6/1970 | Shirayama et al. | 260—897 |
| 3,627,852 | 12/1971 | Aishima et al. | 260—897 X |

FOREIGN PATENTS

| | | | |
|---|---|---|---|
| 1,151,405 | 5/1969 | Great Britain | 260—23 |

DONALD E. CZAJA, Primary Examiner

D. J. BARRACK, Assistant Examiner

U.S. Cl. X.R.

260—23.5 A, 41 R, 897 A, 899